US010112378B2

(12) United States Patent
Barboza

(10) Patent No.: US 10,112,378 B2
(45) Date of Patent: Oct. 30, 2018

(54) METHOD OF MANUFACTURING ANTI-THEFT LABELS

(71) Applicant: Chem Etch Manufacturing Inc., Houston, TX (US)

(72) Inventor: Noah Barboza, Houston, TX (US)

(73) Assignee: Chem Etch Manufacturing Inc., Houston, TX (US)

( * ) Notice: Subject to any disclaimer, the term of this patent is extended or adjusted under 35 U.S.C. 154(b) by 0 days.

(21) Appl. No.: 15/163,157

(22) Filed: May 24, 2016

(65) Prior Publication Data

US 2017/0341364 A1    Nov. 30, 2017

(51) Int. Cl.
*B32B 38/10*    (2006.01)
*B32B 43/00*    (2006.01)
(Continued)

(52) U.S. Cl.
CPC .............. *B32B 43/006* (2013.01); *B32B 7/12* (2013.01); *B32B 38/10* (2013.01); *B41M 5/00* (2013.01); *B42D 25/435* (2014.10); *C08K 5/0041* (2013.01); *C09J 7/00* (2013.01); *C09J 7/29* (2018.01); *G06K 1/126* (2013.01); *G09F 3/02* (2013.01); *G09F 3/0297* (2013.01); *G09F 3/10* (2013.01); *G09F 21/04* (2013.01); *B32B 2305/72* (2013.01); *B32B 2310/0831* (2013.01); *B32B 2310/0843* (2013.01); *B32B 2519/00* (2013.01); *C09J 2205/102* (2013.01); *G09F 3/0291* (2013.01); *G09F 7/165* (2013.01); *G09F 2003/023* (2013.01); *G09F 2003/0226* (2013.01); *G09F 2003/0255* (2013.01); *G09F 2003/0277* (2013.01); *Y10T 156/1158* (2015.01); *Y10T 156/1168* (2015.01); *Y10T 156/1195* (2015.01); *Y10T 156/1917* (2015.01); *Y10T 156/1994* (2015.01)

(58) Field of Classification Search
CPC . B32B 38/10; B32B 43/006; Y10T 156/1158; Y10T 156/1168; Y10T 156/1195; Y10T 156/1917; Y10T 156/1994; G09F 3/02; G09F 3/0291; G09F 3/0297; G09F 3/10; G09F 2003/0226; G09F 2003/023; G09F 2003/0255; H09F 21/04
USPC .......................... 156/712, 714, 719, 753, 767
See application file for complete search history.

(56) References Cited

U.S. PATENT DOCUMENTS 5,151,572 A * 9/1992 Jack ........................ B41C 1/145
219/121.69
5,885,677 A * 3/1999 Gosselin ............... G09F 3/0292
283/101
(Continued)

*Primary Examiner* — Mark A Osele
*Assistant Examiner* — Nickolas R Harm
(74) *Attorney, Agent, or Firm* — Jacob B. Henry; Blank Rome LLP

(57) ABSTRACT

A system and method for manufacturing a strip or label used to place a substantially invisible identifying mark is disclosed. A strip is treated by removing at least one area of a liner element, a film layer and an adhesive layer. Each one of the removed areas is substantially congruent with the other removed areas. A laser or other ablating device is used to remove the areas through vaporization. The strip element is peeled away from the liner element, exposing the adhesive layer. The adhesive layer is thereafter pressed against a substantially flat metal surface. The laminate top coat and the film layer are removed from the object, leaving the adhesive layer in place. The adhesive material is impregnated with a UV sensitive material, but is otherwise invisible.

6 Claims, 8 Drawing Sheets

(51) Int. Cl.

| | |
|---|---|
| *B32B 7/12* | (2006.01) |
| *G09F 3/02* | (2006.01) |
| *G09F 3/00* | (2006.01) |
| *G09F 3/10* | (2006.01) |
| *G09F 21/04* | (2006.01) |
| *G06K 1/12* | (2006.01) |
| *B41M 5/00* | (2006.01) |
| *C09J 7/00* | (2018.01) |
| *B42D 25/435* | (2014.01) |
| *C08K 5/00* | (2006.01) |
| *C09J 7/29* | (2018.01) |
| *G09F 7/16* | (2006.01) |

(56) References Cited

U.S. PATENT DOCUMENTS

| | | | | |
|---|---|---|---|---|
| 6,388,231 | B1* | 5/2002 | Andrews | B23K 26/0846 |
| | | | | 219/121.61 |
| 6,803,084 | B1* | 10/2004 | Do | B65C 9/0006 |
| | | | | 283/103 |
| 9,162,632 | B2* | 10/2015 | Tsuzuki | B32B 37/14 |
| 2003/0148055 | A1* | 8/2003 | Scheubner | G09F 3/02 |
| | | | | 428/40.1 |
| 2009/0218040 | A1* | 9/2009 | Laxton | G01N 19/08 |
| | | | | 156/245 |
| 2010/0190004 | A1* | 7/2010 | Gibbins | A61F 13/02 |
| | | | | 428/346 |
| 2011/0205326 | A1* | 8/2011 | Roth | B41J 2/32 |
| | | | | 347/171 |
| 2013/0167355 | A1* | 7/2013 | Lutz | B44C 1/1729 |
| | | | | 29/428 |
| 2016/0035254 | A1* | 2/2016 | Hong | B42F 21/00 |
| | | | | 428/42.2 |
| 2017/0335620 | A1* | 11/2017 | Meyer | E06B 3/6715 |

* cited by examiner

METHOD OF MANUFACTURING ANTI-THEFT LABELS

FIELD

The present disclosure relates to labelling objects with hidden markings. In particular, the disclosure relates to methods of manufacturing labels which can be used to label objects with hidden markings.

BACKGROUND

Unfortunately, theft of personal property, and theft of automotive vehicles in particular, is all too common in society today. One method of dealing with this problem is for an individual to take steps to secure property, such as by placing a vehicle in a garage, locking the doors, and the like. Other means of preventing theft include alarms systems, such as those that make loud noises or transmit a signal to an owner's electronic device in event of a break in. However, these means tend to be expensive and not wholly reliable. Thus there is room for improvement in the art.

BRIEF DESCRIPTION OF THE DRAWINGS

Implementations of the present application will now be described, by way of example only, with reference to the attached figures, wherein.

Figure 1:
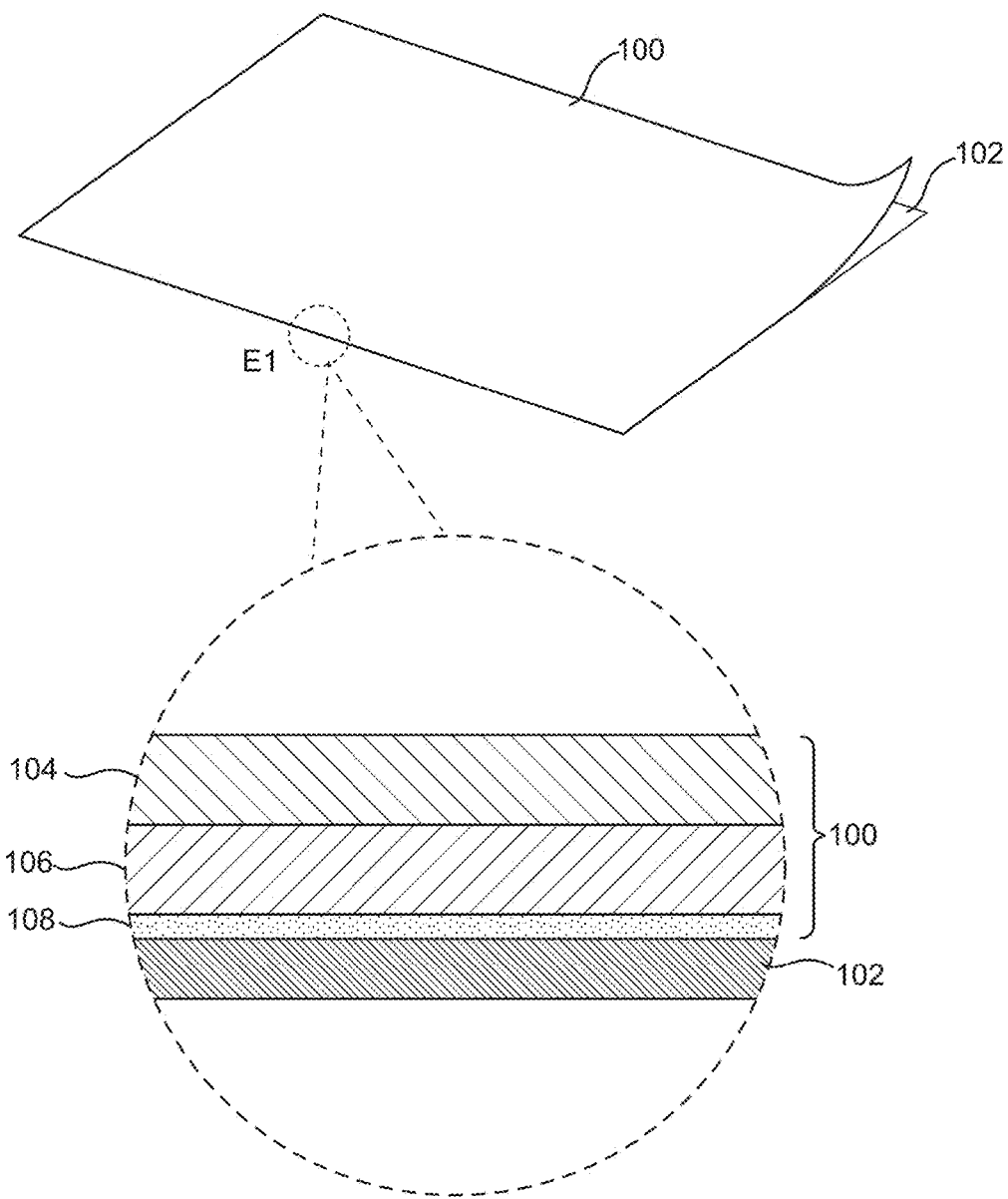
FIG. 1 illustrates a strip element for use in manufacturing a strip for delivering an adhesive to a substantially flat surface in accordance with an example method of this disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

DETAILED DESCRIPTION

This disclosure is directed a marking label, manufactured according to one or more methods disclosed herein, and/or using one or more systems/devices disclosed herein. Marking labels produced according to these methods can be used to deliver a photo-sensitive adhesive marking to objects such as automobile components. The photo-sensitive adhesive can be used to place hidden identifying markings, such as alpha-numeric symbols. The hidden markings can be used to identify stolen car parts, and by visibly identifying a car as having hidden markings, would-be thieves can be deterred.

The following definitions are used in this disclosure: The term "coupled" is defined as connected, whether directly or indirectly through intervening components. The connection can be such that the objects are permanently connected or releasably connected. The term "substantially" is defined to be essentially conforming to the particular dimension, shape or other word that substantially modifies, such that the component need not be exact. As one example, substantially rectangular means that the object resembles a rectangle, but can have one or more deviations from a rectangle. As another example, substantially flat surface means that a surface resembles a plane, but can have one or more deviations from a rectangle, and/or means that a surface is at least flat enough for the surface's intended use. The term "comprising" means "including, but not necessarily limited to"; "comprising" specifically indicates open-ended inclusion or membership in a so-described combination, group, series and the like. The term "photosensitive material" refers to any material that reacts to at least some portion of the light spectrum, such as, for example, material that is sensitive to ultra-violet light, or infra-red light.

At least one embodiment of this disclosure is a method of manufacturing a marking strip for delivering an adhesive to a substantially flat surface. The surface may be a clear-coat-painted surface. The method comprises providing a strip element which is removably joined to a liner element, the strip element comprising a laminate top coat, a film layer and an adhesive layer, and thereafter treating the strip element by removing at least one area of the liner element, the film layer and the adhesive layer, wherein each one of the removed areas is substantially congruent with the removed areas.

At least one embodiment is a method of marking an object with hidden identifying markings. The method includes separating a treated strip element from a liner element, so as to expose the adhesive layer of the strip element. The method of further includes detachably urging the exposed adhesive layer of the strip element against a substantially flat surface of an object, such as a car part. (The adhesive material in the adhesive layer will adhere to the substantially flat surface. In at least one embodiment, the adhesive material will begin to cure as soon as it comes into contact with air; it can therefore be important to apply the label to its intended surface promptly after it is removed from the liner element.) The method can include detaching the laminate top coat and the film layer together, from the object, leaving the adhesive layer in place. Detaching the top coat and film layer can be done shortly after placement, although the label can instead be allowed to remain in place until perhaps removed by an unauthorized person, such as a thief. Regardless of who removes the label (the top coat and film layer), removing the label leaves an indelible hidden identification mark by virtue of the adhesive material which remains in place. In at least one embodiment, the adhesive layer comprises ultra-violet-fluorescent material.

In at least one embodiment, removal of the at least one area of the liner element, the film layer and the adhesive layer, is carried out using a laser beam. Removal of the at least one area of the liner element, the film layer and the adhesive layer, can be achieved by ablating contiguous portions (having the same outline) of the liner element, the film layer and the adhesive layer.

A strip element can be part of a sheet made of multiple strip elements. At least one method of this disclosure includes separating treated strip elements from such a sheet. In at least one embodiment, the sheet has a longitudinal axis and a lateral axis, and the sheet is systematically drawn through a protective housing by a longitudinal force imposed along the longitudinal axis after one or more strip elements is treated, while a lateral force is imposed along the lateral axis, thereby reducing a risk of fire during treatment.

In an alternative embodiment, the sheet can be placed on a sheet-receiving surface inside of a protective housing having longitudinal and lateral sides, such that the longitudinal axis of the sheet is perpendicular to at least one lateral side of the protective housing, and such that the lateral axis of the sheet is perpendicular to at least one longitudinal side of the protective housing. In at least one embodiment of a strip element the surface area of a side of the laminar top coat distal from the adhesive layer is at least 2.2 square inches.

An embodiment is a system for manufacturing a marking strip for delivering an adhesive to a flat surface. The system includes a processor, an ablating tool which is coupled to the processor, and a non-transitory computer readable medium (memory) storing instructions. Upon execution, the instructions cause the processor to control the ablating tool to treat a strip element so as to enable the strip element to be used to deliver a photo-sensitive adhesive to a substantially flat surface, the strip element comprising a laminate top coat, a film layer and an adhesive layer. In this embodiment, treating the strip element includes removing at least one area of the liner element, the film layer and the adhesive layer, and wherein each one of the removed areas is substantially congruent with the removed areas.

FIG. 1 illustrates a strip element 100 which is attached to a liner element 102. The strip element 100 is attached to the liner element 102 such that the strip element 100 can be separated from the liner element 102 without damaging either one, as by peeling. When the strip element 102 has been separated or removed from the liner element 102, an adhesive layer 108 is revealed. The adhesive layer 108 comprises an adhesive that has cohesive forces and an adhesive force adhering the adhesive layer 108 that are stronger than the adhesive force which attaches the liner element 100 to the strip element. The liner element 102 can be made of wax paper or a similar foil suitable for releasably retaining the strip element 100 in place and covering the adhesive layer 108 until used to place the adhesive material onto a surface, as will be described in greater detail below, (see FIGS. 6-7).

In the embodiment shown in FIG. 1, the strip element has three layers (104, 106, 108), which can be seen in enlarged region E1. The outer (or upper) layer 104 is a laminate top coat. The outer layer 104 is next to and irremovably affixed to a film layer 106. The film layer 106 is in turn adjacent to the adhesive layer 108. In at least one embodiment of this disclosure, the adhesive can be impregnated with a photo-sensitive material.

In the example shown in FIG. 1, the film layer 106 is composed of silver Mylar™, however other suitable materials can be used. In general, any metallised film can be used. The film layer 106 consists of a polymer composition mainly comprising polyethylene terephthalate and a one or more metals. Metals such as silver, aluminum, copper or gold can be used. Metal oxides or metal alloys can also be incorporated into the polymer film that forms the film layer 106. Numerous potential metals, metal oxides or metal alloys can be used to yield a thin layer having a colored appearance. In some instances a metal foil such as for example, aluminum or tin foil can be used. A metal foil can be used as an alternative to a metallised polymer film.

The adhesive of the adhesive layer 108 can be any suitable adhesive that comprises a fluorescent or phosphorescent material. The adhesive can incorporate materials that phosphoresce and/or fluoresce. These actions correspond to different types of light/UV (ultra-violet) excitation that result in a color emission.

Figure 2:
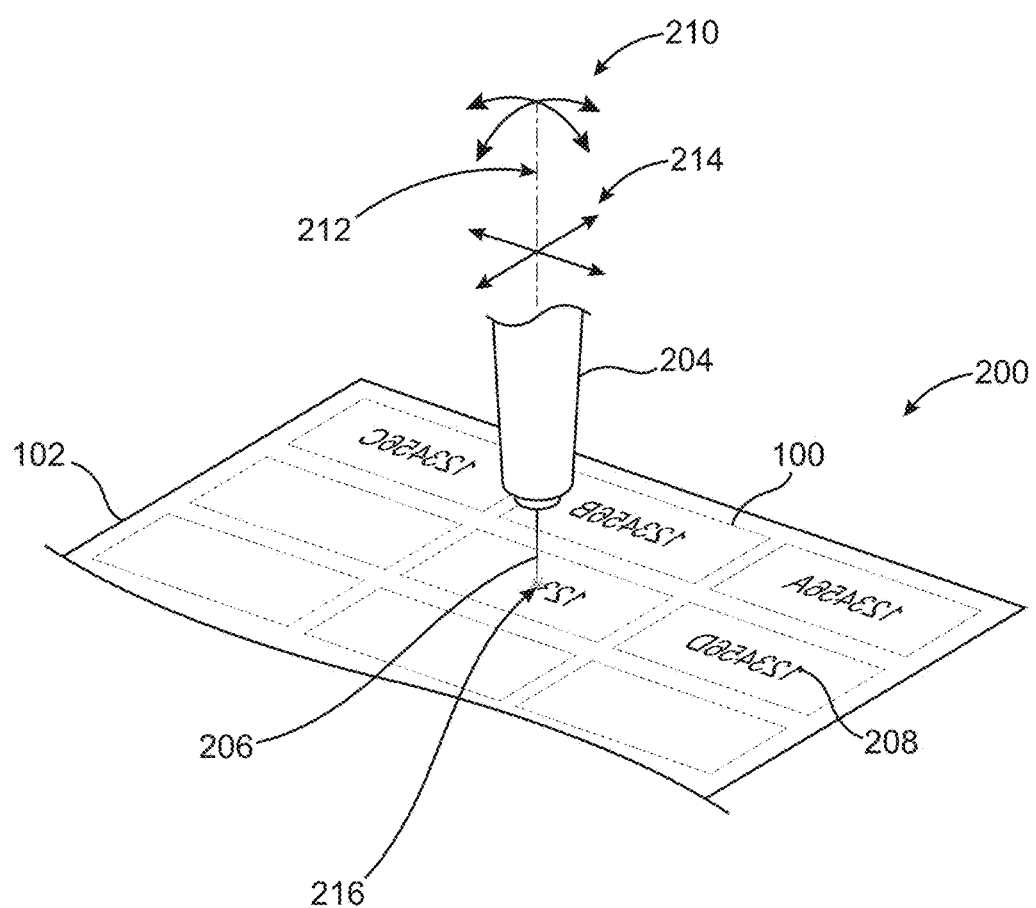
FIG. 2 illustrates implementation of a method of manufacturing a strip for delivering a UV-fluorescent adhesive to a surface.

FIG. 2 illustrates implementation of a method of manufacturing a strip (600) for delivering a UV-fluorescent adhesive (106) to a surface. FIG. 2 illustrates an ablating tool 204 being used to ablate 216 portions of strip elements 100 so as to create identifying markers 208. The ablating tool 204 in the embodiment of FIG. 2 emits a laser beam 206 that vaporizes areas of the strip element 100. In at least one embodiment, the ablating tool 204 can be a 30 watt laser device. As will be discussed in detail below, the ablating/laser tool 204 will usually be controlled by a computer processor, (see FIG. 8). In at least one embodiment, the ablating tool 204 can instead emit a heat ray (206)—a high-powered beam of greater-than-95 GHz waves. The strip elements 100 are attached to a sheet 200 of liner material 102. The edges of the strip elements 102, as well as the corresponding portions of the sheet 200 of liner material 102, can be perforated, so that each strip (along with its corresponding liner 102), can be separated easily from the remainder of the sheet 102. The ablating tool 204 illustrated has a longitudinal axis 212. The ablating tool 204 can move in the X-Y plane 214 and/or can be angled 210 so as to be able to ablate more regions without having to move in the X-Y plane. In at least one embodiment, the ability of the ablating tool 204 to rotate about axis 212 can enable marking strips (600) to be manufactured more quickly than would otherwise be the case.

Figure 3:
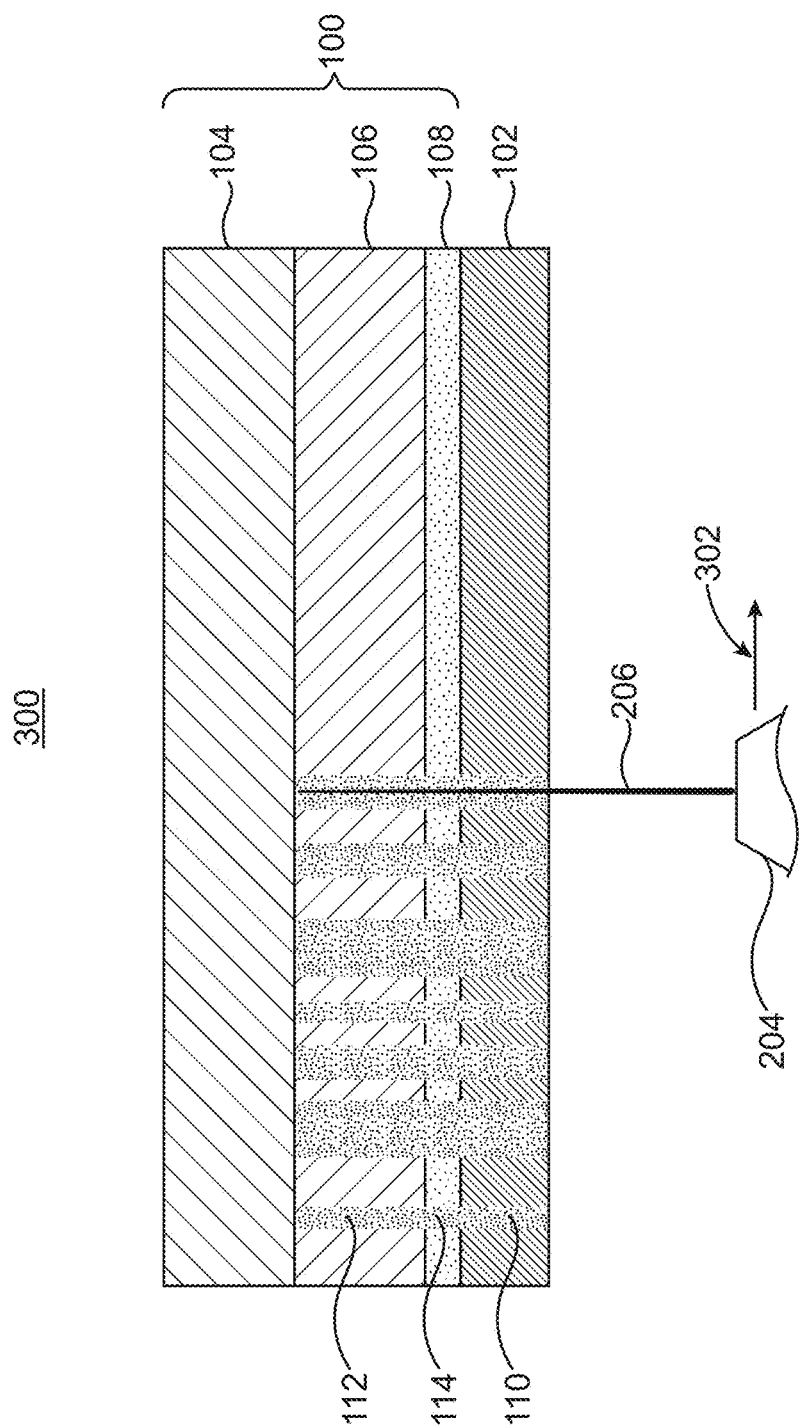
FIG. 3 illustrates a cross-sectional view of a strip element attached to liner element.

FIG. 3 illustrates a cross-sectional view 300 of a strip element 100 which is attached to liner element 102. Ablating tool 204 can be seen to be removing corresponding portions (110, 114, 112) of the liner element 102, the adhesive layer 108, and the film layer 106, respectively. The ablating tool 204 removes these portions by use of a laser beam, as described above. The portions 110-112 will normally be congruent. That is they will have the same outline when viewed from above or below (as in the direction of beam 206). As illustrated, not all layers of the strip element 100 have portions removed. Notably, the laminate top coat 104 remains substantially unchanged during manufacturing of the marking strip (600). During manufacturing, the ablating tool 204 moves in an overall general direction 302 with respect to the sheet 200 of liner elements 100. The vaporized material from areas 110-112 will usually be drawn away from the treated strip elements 100 (that is, fully ablated) by a vacuum mechanism or fan mechanism during manufacturing.

Figure 4:
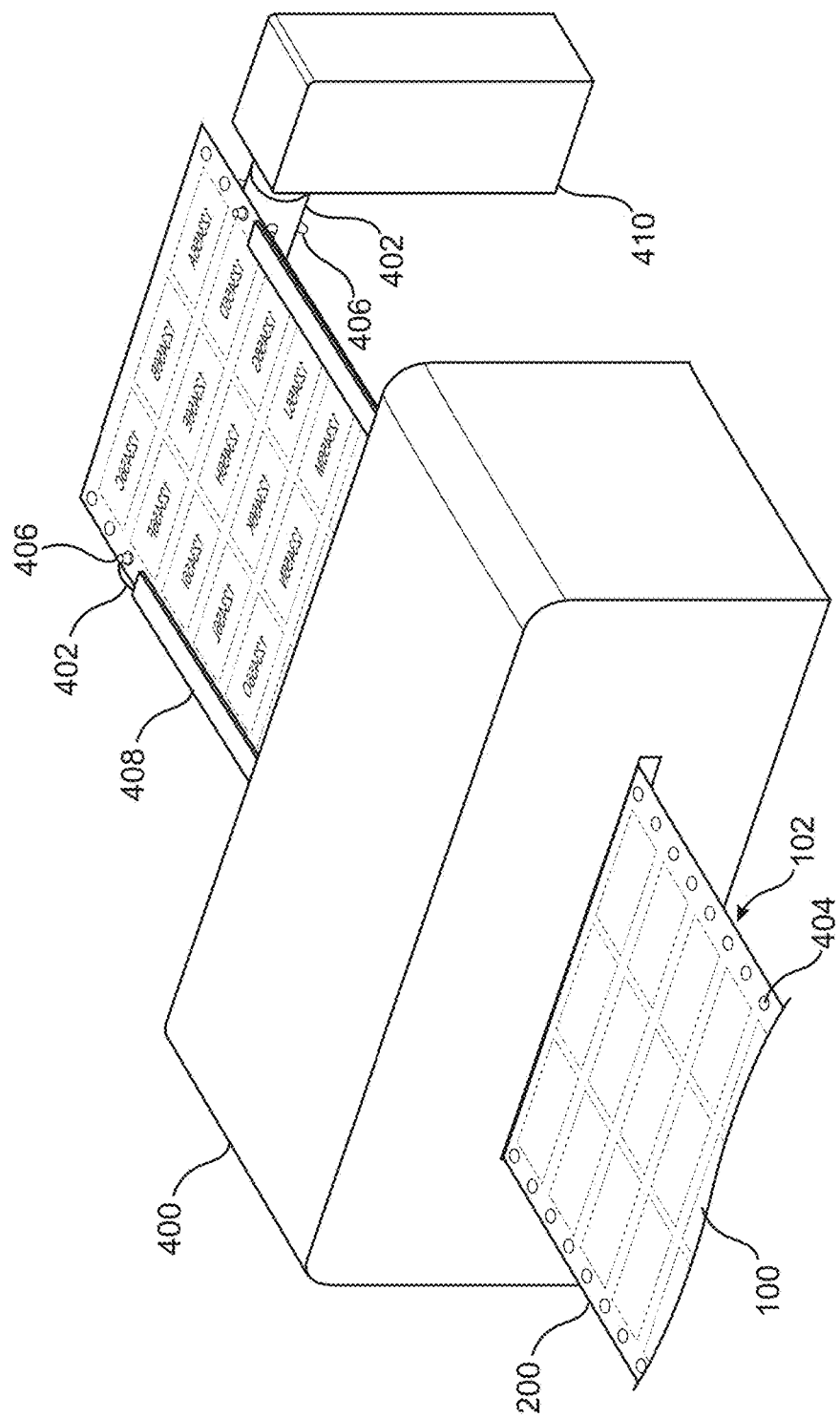
FIG. 4 illustrates a method of manufacturing marking strips.

FIG. 4 illustrates a process of manufacturing marking strips (600). As shown, a sheet 200 of strip elements can be pulled through an ablative-machinery housing 400 by a rotating spindle 402 driven by a motor 410. The ablative-machinery housing 400 houses an ablative tool (e.g., 204) and is configured to operate in the manner described above. The dimples 406 on the spindle 402 protrude into the holes 404 along the sides of the sheets. The dimples 406 move away from the ablative-machinery housing 400 in the area proximate the sheet 200 as the spindle 402 rotates. Other feeding/drawing mechanisms for urging the sheet 200 through the ablative-machinery housing 400 are possible within this disclosure. It is possible that a rotating drum or wheels could be used instead of a spindle configuration. In at least one embodiment of this disclosure, the ablative-machinery housing 400 is configured so as to impose lateral tension such as by pull-rods 408, in addition to the longitudinal tension imposed by the spindle arrangement (402, 410). Imposing additional tension in this manner can enable a more accurate ablating process, leading to markings which are sharper than would otherwise be the case. Imposing additional tension can also reduce a risk of fire by helping to ensure that areas of the strip element 102 are removed in a uniform fashion such that at any given instant no more material (102, 104, 106) is removed than is required. In other words, the relevant amount of combustible material (fuel for a potential fire) is effectively reduced because less material is exposed to the laser beam 206 at any given moment.

Figure 5:
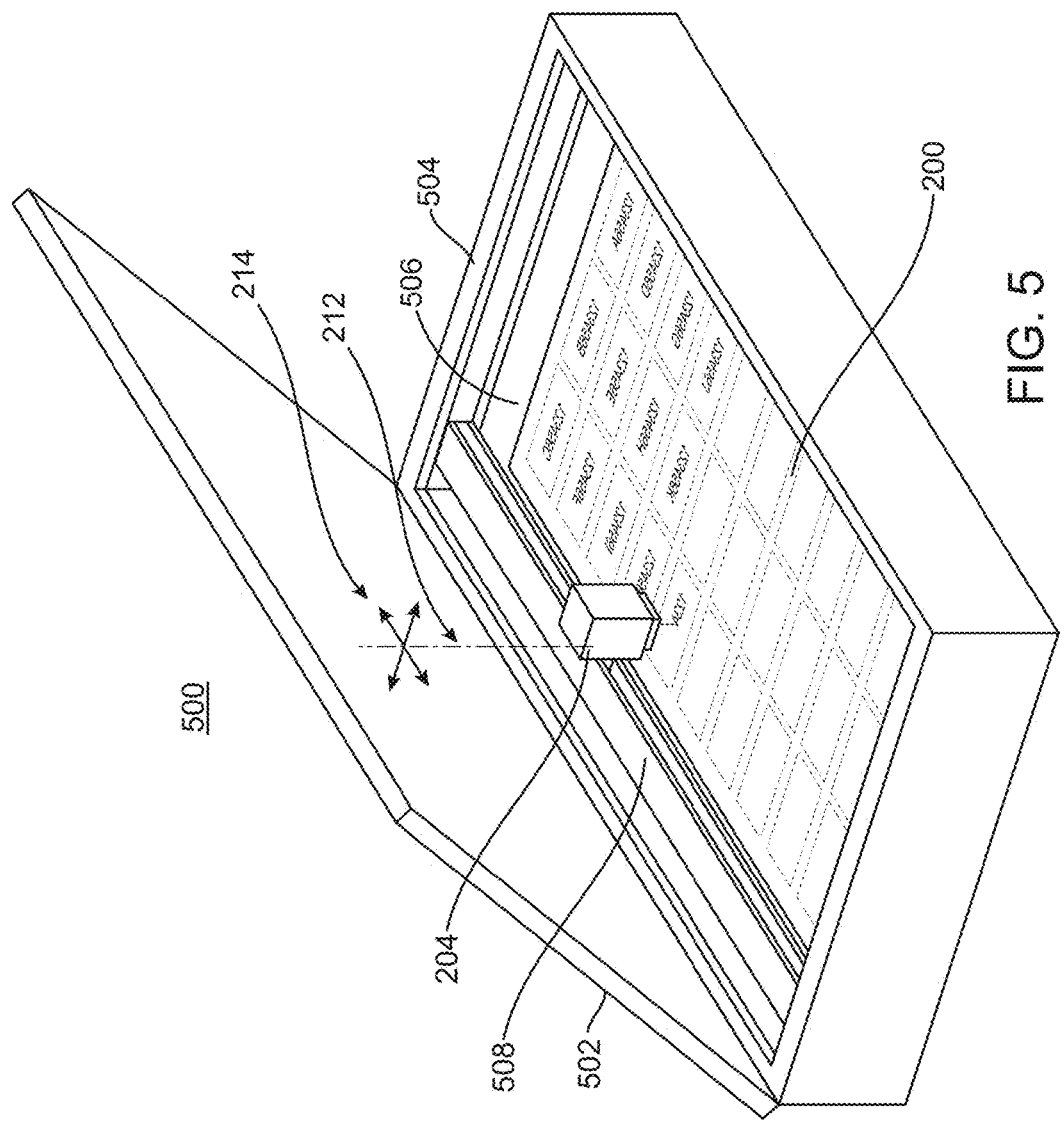
FIG. 5 illustrates another method of manufacturing marking strips.

FIG. 5 illustrates another method 500 of manufacturing marking strips (600). As illustrated, a sheet 200 of strip elements 100 is placed on a surface 506 inside a protective housing 504. In this example, an ablating tool 204 is controlled to move along a guiding rail 508 within the protective housing 504. The ablating tool 204 vaporizes congruent portions of the layers of the strip elements 100 as described above, (see FIG. 2). The ablating tool 204 is controlled to move in the X-Y plane perpendicular to the longitudinal axis of the ablating tool 204. The ablating tool 204 is guided by a processor executing control instructions, such as those of Corel Draw™ or other suitable computer products. In order to achieve best results, the sheet 200 is placed on surface 506 such that its edges are parallel with the interior sides of the protective housing 504. The protective housing 504 has a lid 502 which can be opened so that sheet 200 can be placed on the sheet-receiving surface 506. The lid 502 in the embodiment shown in FIG. 5 is made of a see-through material, such as a strong plastic, so that the manufacturing process can be monitored by an observer. The lid 502 can be constructed from translucent, transparent, and/or opaque materials. Once all of the strip elements have been treated, (see FIG. 2), the sheet 200 can be removed from the protective housing 504 and replaced. Once the sheet 200 is removed, individual strip elements 100 can be detached from the sheet 200, each strip element 100 having its adhesive layer still covered by an individual liner element 102, (see FIG. 6).

Figure 6:
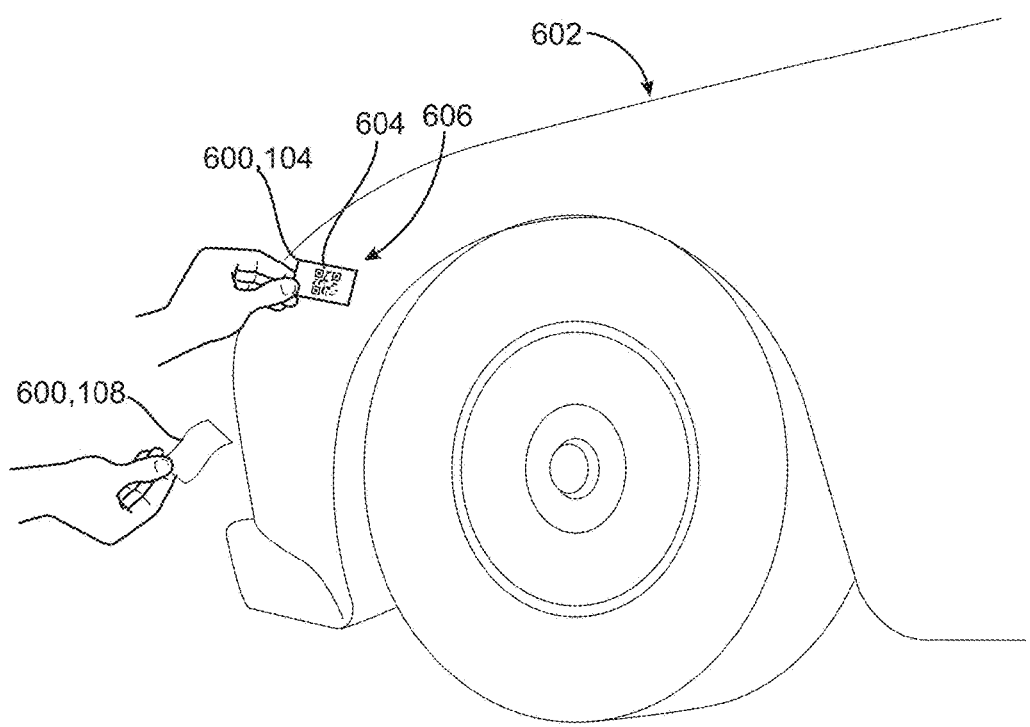
FIG. 6 illustrates a marking strip being applied to a substantially flat surface.

FIG. 6 illustrates a marking strip 600 being applied to a substantially flat surface 606 of an object 602, in this case a wing of an automobile. Although the wing of a car is used in this example, other areas and/or parts of an automotive vehicle can be suitably marked according to one or more methods of this disclosure. For example, the four doors, the trunk and the hood of a vehicle could each be marked with a hidden identifier. The identifiers used on each of these components can be the same. The identifiers can be different. The identifiers can have common elements and have elements which differentiate them from the other identifiers placed on the same vehicle. The strip element 100 has been separated from the liner element 102, (see FIG. 1 showing strip element 100 being peeled apart from liner element 102), to form marking strip 600. In the example shown in FIG. 6, marking strip 600 consists of a strip element with its adhesive layer 108 exposed. Thus, one side of the marking strip 600 is the exposed adhesive layer 108 and the other side is laminar top coat 104. The adhesive layer 108 of marking strip 600 is urged against substantially flat surface 606. In at least one embodiment, the surface 606 is a metal surface.

Surface 606 can also be painted with a clear coat paint. The adhesive layer 108 can bond with a metal surface and it can bond with a clear-coat-painted surface. Also within this disclosure, the adhesive layer 108 can be applied to a metal surface, allowed to cure, and the adhesive layer and metal surface can be painted with a clear coat paint, making the hidden information extremely hard to remove, even if located. A substantially flat surface 606 can be any surface which is free of discontinuities, free of debris, and sufficiently planar to receive the adhesive layer 108. In the embodiment shown in FIG. 6, the laminate top coat 104 contains a QR code 604. QR codes 604, or other suitable identification codes, can be used to identify individual strip elements 102 (or groups of strip elements 102). During the manufacturing process, the relationship between the codes 604 and the identifiers 208 for individual strip elements 100 can be tracked and stored for subsequent retrieval. Such information can, for example, be used to note the location(s) on a vehicle where identifying markings 208 have been placed.

Figure 7:
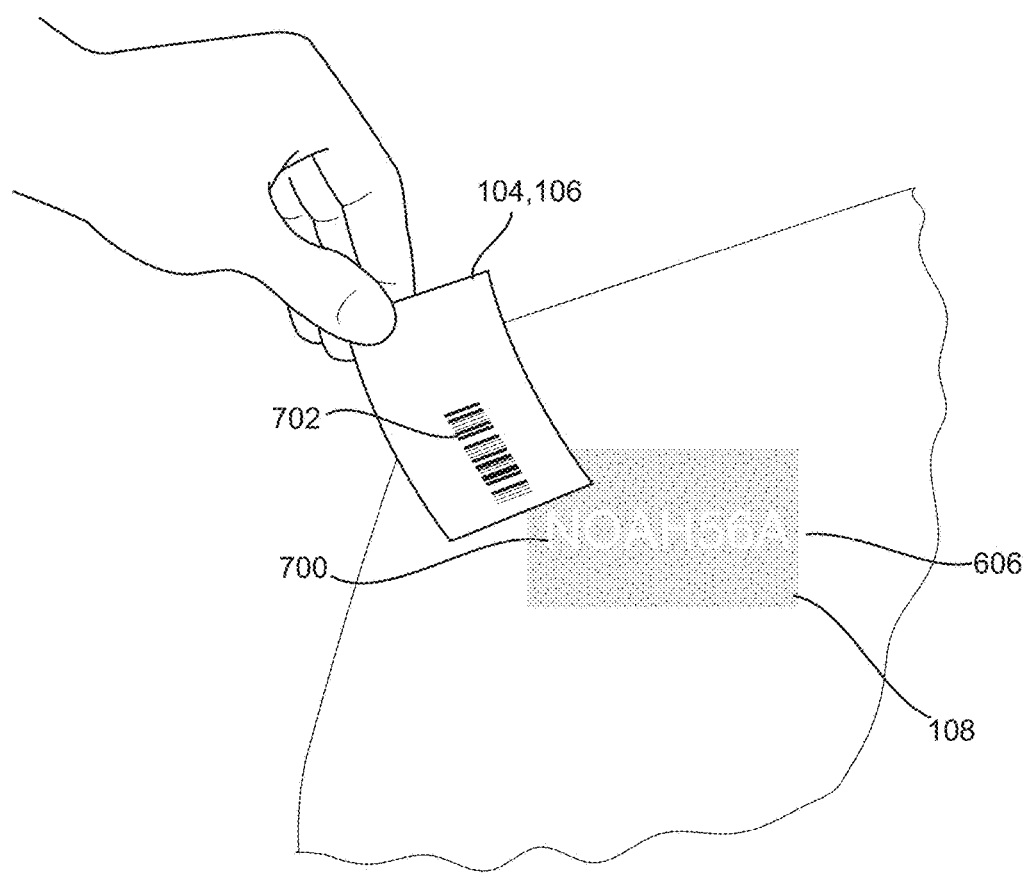
FIG. 7 illustrates the final stages of a method of marking an object.

FIG. 7 illustrates the final stages of a method of marking an object. After the strip element 102 is applied to the substantially flat surface 606, the laminar top coat 104 and film layer 106 are (jointly) removed from the flat surface 606. When these elements (104, 106) are removed (such as by a thief or other unauthorized user) they leave behind adhesive layer 108 on the substantially flat surface 606. Adhesive layer 108 is composed such that adhesive layer 108 adheres more to example surface 606 than the adhesive layer adheres to film layer 106. In the example shown in FIG. 7, the regions (114) which have been removed from the adhesive layer 108 form identifying markings 700 within the adhesive material 108 still present, in a 'reverse-stencil' fashion. In at least one embodiment, the adhesive material 108 is invisible to the naked eye under ordinary conditions, but contains photo-sensitive material which can make the adhesive material visible when it is exposed, for example, to UV rays. In at least one embodiment, the UV pigmented material 108 can penetrate a clear coat or other similar material on the surface 606 as the adhesive material 108 cures.

Figure 8:
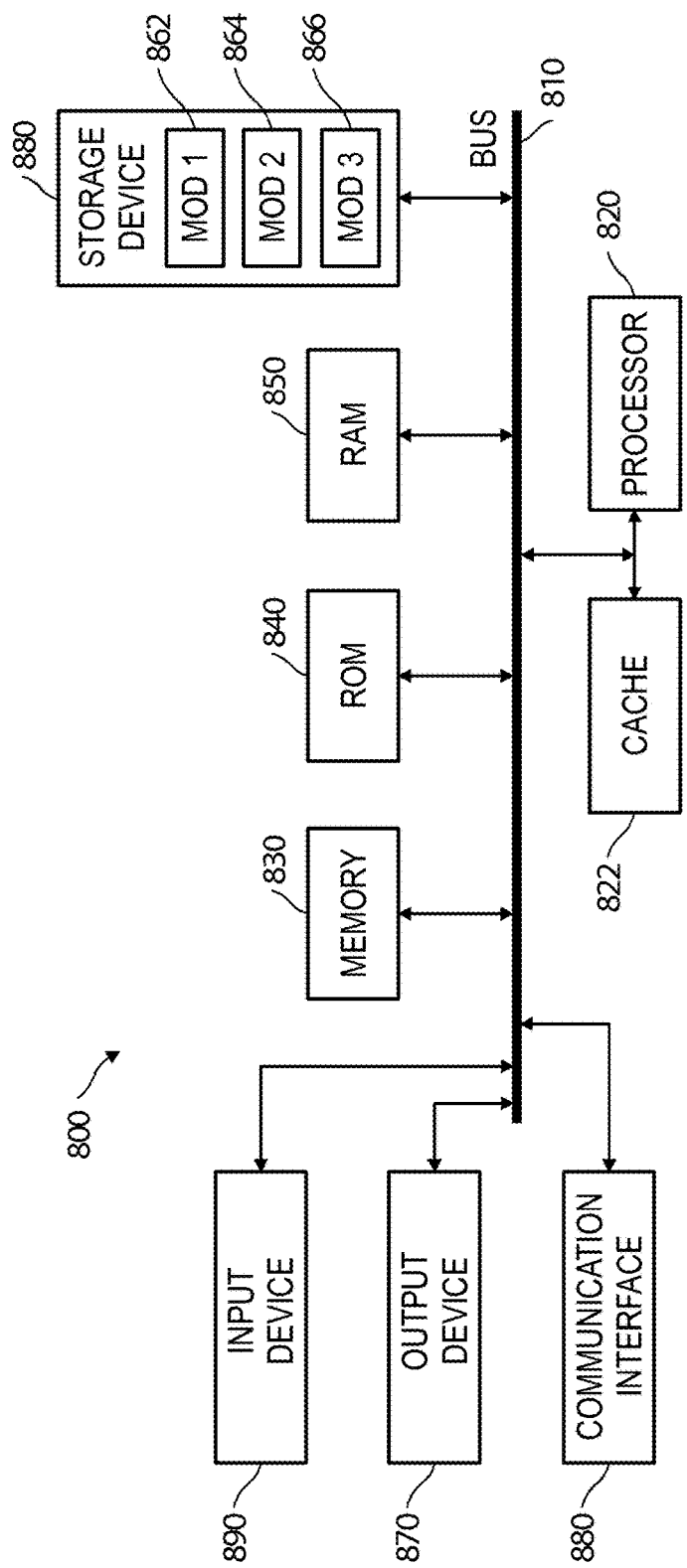
FIG. 8 illustrates a system configured to implement methods of this disclosure.

The disclosure now turns to a brief description of a computing device, as shown in FIG. 8, which can be employed to practice the concepts and methods described above for manufacturing anti-theft labels. The components disclosed herein can be incorporated in whole or in part into tablet computers, personal computers, handsets, transmitters, servers, and any other electronic or other computing device.

With reference to FIG. 8, an exemplary system 800 includes a computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 (862), module 2 (864), and module 3 (866) stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide non-volatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, output device 870 (e.g. ablating tool 204), and so forth, to carry out the function.

Although the exemplary embodiment described herein employs the hard disk 860, it should be appreciated by those skilled in the art that other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can comprise one or more of a number of output mechanisms, such as ablating tool 204. In some instances, multimodal systems enable a user to provide multiple types of input to communicate with the computing device 800. The communications interface 880 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 8 is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

What is claimed is:

1. A method of manufacturing a marking strip for delivering an adhesive to a flat surface, the method comprising:
   providing a strip element removably joined to a liner element, the strip element comprising a laminate top coat, a film layer and an adhesive layer;
   treating the strip element by removing at least one area of the liner element, removing at least one area of the film layer and removing at least one area of the adhesive layer, wherein the area removed from the liner element, the area removed from the film layer, and the area removed from the adhesive layer are substantially congruent with one another; and
   separating the treated strip element from a sheet of other strip elements;
   wherein the sheet has a longitudinal axis and a lateral axis, and the sheet is systematically drawn through a protective housing by a longitudinal force imposed along the longitudinal axis after one or more strip elements is treated, while a lateral force is imposed along the lateral axis, thereby reducing a risk of fire during treatment.

2. The method of claim 1, wherein removal of the at least one area of the liner element, the film layer and the adhesive layer, is carried out using a laser beam.

3. The method of claim 1, wherein removal of the at least one area of the liner element, the film layer and the adhesive layer, is achieved by ablating contiguous portions of the liner element, the film layer and the adhesive layer.

4. The method of claim 1, wherein the adhesive layer comprises ultra-violet-fluorescent material.

5. The method of claim 1, wherein the sheet is placed on a sheet-receiving surface inside of the protective housing such that the longitudinal axis of the sheet is perpendicular to at least one lateral side of the protective housing, and such that the lateral axis of the sheet is perpendicular to at least one longitudinal side of the protective housing.

6. The method of claim 1, wherein the surface area of a side of the laminate top coat distal from the adhesive layer is at least 1.9 square inches.

\* \* \* \* \*